United States Patent [19]

Buie

[11] Patent Number: 5,119,901
[45] Date of Patent: Jun. 9, 1992

[54] VEHICLE AIR BAG PROTECTION SYSTEM

[76] Inventor: Dewayne T. Buie, 211 Hidden Glen Way, Dothan, Ala. 36301

[21] Appl. No.: 656,636

[22] Filed: Feb. 19, 1991

[51] Int. Cl.⁵ .............................................. B60R 21/32
[52] U.S. Cl. .................................. 180/274; 280/735; 280/748; 180/282; 340/435; 340/436; 340/903
[58] Field of Search ............... 180/274, 167, 169, 232, 180/282; 280/728, 734, 735, 748; 340/435, 436, 903; 293/4

[56] References Cited

U.S. PATENT DOCUMENTS

| | | | |
|---|---|---|---|
| 3,192,437 | 6/1965 | Meyer | 340/903 X |
| 3,683,379 | 8/1972 | Saddler et al. | 180/169 X |
| 3,689,882 | 9/1972 | Dessailly | 340/903 |
| 3,703,300 | 11/1972 | Gillund et al. | 180/274 X |
| 3,891,966 | 6/1975 | Sztankay | 340/903 |
| 3,927,901 | 12/1975 | Weman | 280/734 |
| 4,243,248 | 1/1981 | Scholz et al. | 280/735 |
| 4,706,990 | 11/1987 | Stevens | 280/734 |
| 4,797,673 | 1/1989 | Dombrowski | 180/169 X |

FOREIGN PATENT DOCUMENTS

| | | | |
|---|---|---|---|
| 152968 | 8/1985 | Japan | 180/274 |
| 166546 | 8/1985 | Japan | 180/274 |
| 37700 | 2/1989 | Japan | 340/903 |
| 2173560 | 10/1986 | United Kingdom | 180/274 |

Primary Examiner—Charles A. Marmor
Assistant Examiner—Tamara L. Finlay

[57] ABSTRACT

A vehicle air bag passenger protection system that includes switches in the vehicle bumpers. Control signals are generated by the switches to produce rapid inflation of air bags in the passenger compartment of the vehicle. As a further protective feature, a distance measuring system is provided for generating an alarm signal when the vehicle is moving at a significant speed, and another vehicle is so close as to present the possibility of a collision situation.

1 Claim, 1 Drawing Sheet

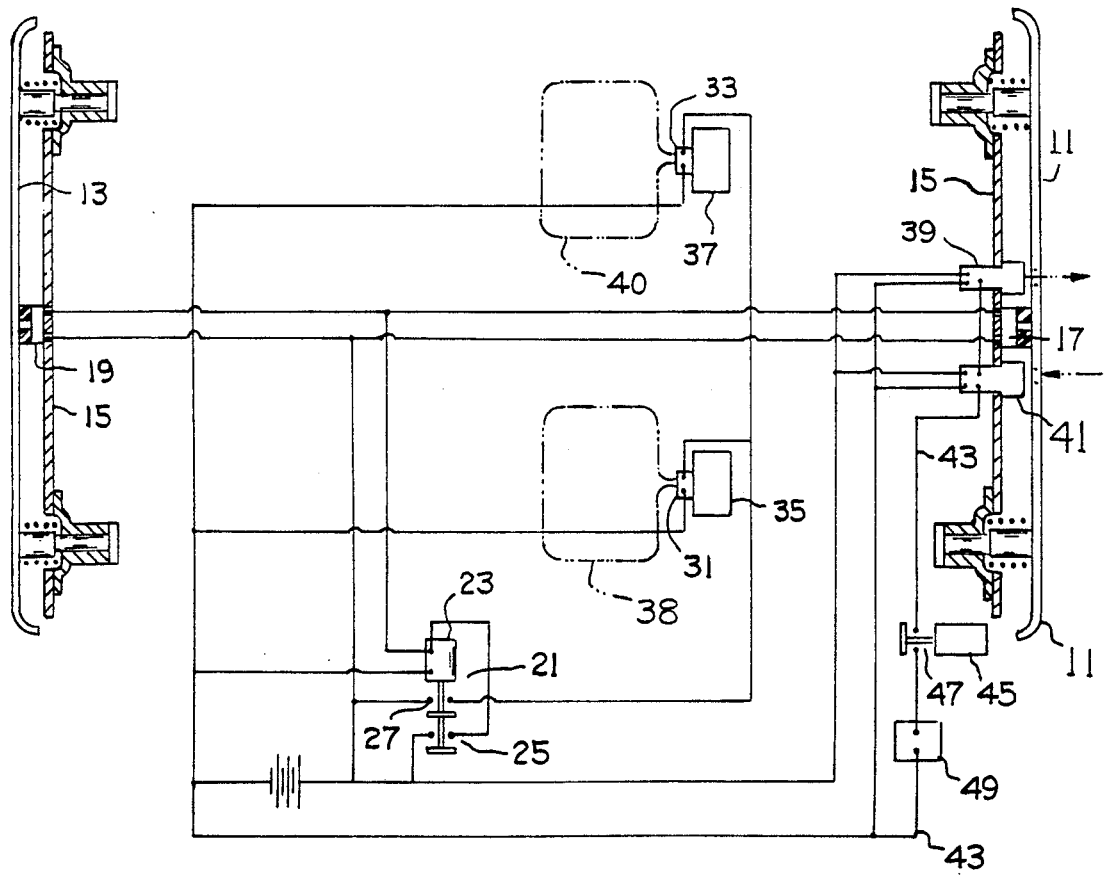

VEHICLE AIR BAG PROTECTION SYSTEM

BACKGROUND AND SUMMARY OF THE INVENTION

This invention relates to a vehicle passenger protection system that includes means for automatically inflating two or more passenger restraint air bags in response to impact forces associated with a collision accident. The protection system further includes an alarm system for alerting the driver of the vehicle to the fact that another vehicle in in a dangerously close position. Generation of an alarm signal enables the driver to apply his/her brakes or take evasive action for avoiding a collision or minimizing damage resulting from a collision.

A safety air bag system is shown in U.S. Pat. No. 3,927,901 to P. Weman, U.S. Pat. No. 4,243,248 to Scholz et al also shows a vehicle air bag protection system. An impact sensor for a vehicle air bag protection system is shown in U.S. Pat. No. 4,706,990.

The present invention relates to an air bag protection system designed for reliability and low cost. The system is operative when the vehicle is moving and also when the vehicle is stationary. An alarm system is provided for generating an alarm signal when the vehicle is moving, and other vehicles are so close as to pose the danger of a collision.

THE DRAWINGS

The single figure diagrammatically illustrates a passenger protection system embodying the invention.

DESCRIPTION OF A PREFERRED EMBODIMENT OF THE INVENTION

The drawing diagrammatically shows an automotive vehicle having a front bumper 11 and a rear bumper 13. Each bumper is resiliently mounted on the vehicle frame 15 so that in the event of an impact with another vehicle the bumper can move slightly toward the frame, thereby operating an electric switch 17 or 19 to a circuit-closed condition. Normally each switch is in circuit-open condition.

A relay 21 has its coil 23 connected to switches 17 and 19 so that actuation of either switch energizes the relay, thereby closing relay contacts 25 and 27. The switches are in parallel with each other between the voltage source (battery) and relay coil 23. Contacts 25 act as holding contacts to keep the relay coil energized even though the associated switch 17 or 19 becomes inoperative as a circuit closing device. Contacts 27 are electrically connected to electrical control devices 31 and 33. Each control device 31 or 33 can be a solenoid valve for controlling the flow of pressurized air from a pressurized air source 35 or 37 to an air bag 38 or 40. Normally each air bag is in a deflated condition within a small container in the passenger compartment, e.g. in the steering wheel, or in the dashboard, or in the roof, or in one of the vehicle doors.

When an electrical signal is delivered through relay contacts 27 to control devices 31 and 33 the air bags are pressurized to the inflated conditions indicated by the dashed lines in the drawing. The inflated bags will restrain the passengers against forward motions, thereby protecting them from serious injury.

The drawing shows two air bags located, for example, to restrain persons in the front seat of the vehicle. Additional air bags can be provided to restrain passengers in the rear seat of the vehicle. The rear seat air bags can be housed in small containers mounted in the vehicle roof or in back portions of the vehicle front seats.

Air pressure sources 35 and 37 can be air tanks pressurized to an appropriate pressure, e.g. 100 p.s.i. Alternately, the pressurizing gas for each air bag can be created chemically, as shown for example in U.S. Pat. No. 4,319,640. In that event each control device 31 or 33 can be a high intensity electric heater contained within an explosive squib; a mass of chemically reactive particles is reacted by the squib heat to generate large quantities of nitrogen gas within a few milliseconds following the application of an electrical signal to control device 31 or 33.

The air bags are pressurizable whether the vehicle is moving or stationary. The triggering force for pressurization is switch 17 or switch 19.

As a further protective measure, the system includes an indicating means for alerting the driver of the vehicle to the approach of another vehicle to a dangerously close position in which there is an increased potential for a collision. An audible alarm signal is generated so that the driver can apply the vehicle brakes and/or steer the vehicle away from the danger. The alarm system is operative only when the vehicle is moving above some threshold speed where the danger is likely to be serious, e.g. forty miles per hour.

The alarm-indicating means comprises a pulse emitter 39 and a pulse receiver (detector) 41 located behind one of the vehicle bumpers. The emitter and detector can be components of a radar ranging device that measures the distance between the vehicle and other vehicles in the path of the pulses generated by emitter 39. Alternately the emitter and detector can be laser devices similar to devices used in military range finder systems. Commonly such devices sense the travel time between initial generation of a pulse by emitter 39 and the return of a reflected portion of the pulse to detector 41; the sensed time interval is related to the distance between the two vehicles.

The output signal generated by detector 41 can be an on-off signal wherein the signal is "on"0 when the measured distance is less than some predetermined safe distance, e.g. forty feet. The output signal is delivered through electric line 43. A speedometer mechanism 45 can be arranged to sense the rotational speed of the vehicle wheels or a gear in the drive train. Mechanism 45 energizes a relay 47 when the vehicle speed is above some predetermined value, e.g. forty miles per hour. The relay contacts are then closed to pass the alarm signal through line 43 to an audible alarm device 49. The driver is thus alerted to a potentially dangerous condition posed by the near proximity of the other vehicle. The driver=warning system is only operative when the vehicle is moving above a speed where braking or evasive action can be effective to prevent or minimize the effects of a collision with another vehicle or stationary object.

The drawings show one specific arrangement embodying the invention. Other arrangements can be used in the practice of the invention.

I claim:

1. In an automotive vehicle having a frame, a front bumper resiliently mounted on said frame, and a rear bumper resiliently mounted on said frame: the improvement comprising a vehicle passenger protection system that includes a voltage source; a first switch means mounted on the frame behind the front bumper for actuation in response to deflection of the front bumper toward the frame; a second switch means mounted on the frame in front of the rear bumper for actuation in response to deflection of the rear bumper toward the frame; a mechanical relay having a relay coil and a set of controlled contacts; said first switch means and said second switch means being in parallel with each other between the voltage source and said relay coil, so that actuation of either switch means operates the relay; each switch means being independently closeable in response to impaction force on the associated bumper due to a collision event; at least two inflatable air bags within said vehicle; an air pressure source for each air bag; electrical control means for each air pressure source connected to said controlled contacts, whereby operation of the relay causes each air bag to be inflated to a condition for protecting against injury to a passenger in the vehicle; and means for indicating the approach of another vehicle at a dangerous rate; said indicating means comprising a pulse emitter aimed through one of vehicle bumpers along the vehicle path, a return pulse detector located behind said one vehicle bumper for receiving pulses through said one bumper and for detecting time intervals between the emitted pulses and the return pulses, said pulse detector including means for generating an alarm signal when the time intervals are below a predetermined value representing a dangerous condition; an alarm device energizable by the alarm signal; and speedometer means responsive to vehicle speed for preventing the alarm device from being energized except when the vehicle speed is above a predetermined value.

* * * * *